United States Patent [19]

Swift

[11] Patent Number: 5,418,464
[45] Date of Patent: May 23, 1995

[54] THERMOCOUPLE OPEN CIRCUIT DETECTION WITH TONE FREQUENCY SIGNAL APPLICATION AND SPECTRAL ANALYSIS

[75] Inventor: Steven D. Swift, Seattle, Wash.

[73] Assignee: John Fluke Mfg. Co., Inc., Everett, Wash.

[21] Appl. No.: 97,439

[22] Filed: Jul. 26, 1993

[51] Int. Cl.⁶ ............................................. G01R 31/02
[52] U.S. Cl. ................................. 324/537; 324/549; 340/652
[58] Field of Search ...................... 324/76.12, 520, 527, 324/537, 549, 555; 340/652, 658; 73/658, 659

[56] References Cited

U.S. PATENT DOCUMENTS

| | | | |
|---|---|---|---|
| 3,590,370 | 6/1971 | Fleischer | 324/537 |
| 3,760,265 | 9/1973 | Hutch | 324/537 |
| 4,166,243 | 8/1979 | West et al. | 324/537 |
| 4,307,335 | 12/1981 | Paulson | 324/537 |
| 4,841,286 | 6/1989 | Kummer | 324/537 |
| 4,965,513 | 10/1990 | Haynes et al. | 73/659 |

Primary Examiner—Kenneth A. Wieder
Assistant Examiner—Christopher M. Tobin
Attorney, Agent, or Firm—John P. Dellett; James H. Walters

[57] ABSTRACT

An improved open circuit detector for testing a thermocouple for an open circuit condition. The detector includes a generator for providing and sourcing a tone signal to the thermocouple, wherein the tone signal has a known frequency and amplitude. A monitor analyzes the amplitude of a particular frequency component of a tone signal across the thermocouple. If the amplitude of the particular frequency component exceeds a predetermined threshold, an output is provided for indicating an open circuit condition for the thermocouple.

16 Claims, 7 Drawing Sheets

THERMOCOUPLE OPEN CIRCUIT DETECTION WITH TONE FREQUENCY SIGNAL APPLICATION AND SPECTRAL ANALYSIS

BACKGROUND OF THE INVENTION

The present invention relates to a method and apparatus for detecting an open circuit condition of a thermocouple.

A thermocouple is a bi-metallic junction device for electrically measuring temperature. The bi-metallic junction of the thermocouple produces a voltage across the junction in accordance with the temperature of the thermocouple, wherein a voltmeter may be used to read and record the voltage so as to monitor temperature. In normal operation, the thermocouple resistance is quite low. However, if the two metals associated with the bi-metallic junction lose contact with one another, then an open circuit failure condition results and the thermocouple will no longer produce the desired voltage.

In measurement applications, a thermocouple may be inserted into a system for monitoring the temperature of a given element for assisting the system in regulating the temperature. The voltage produced by the thermocouple is read by an instrument for detecting when the temperature of the element exceeds a predetermined threshold, and corrective action may follow. However, if the thermocouple fails, the system may also fail. It is therefore desirable to periodically check the thermocouple for an open circuit condition in order to verify whether the device is functional.

Figure 1:
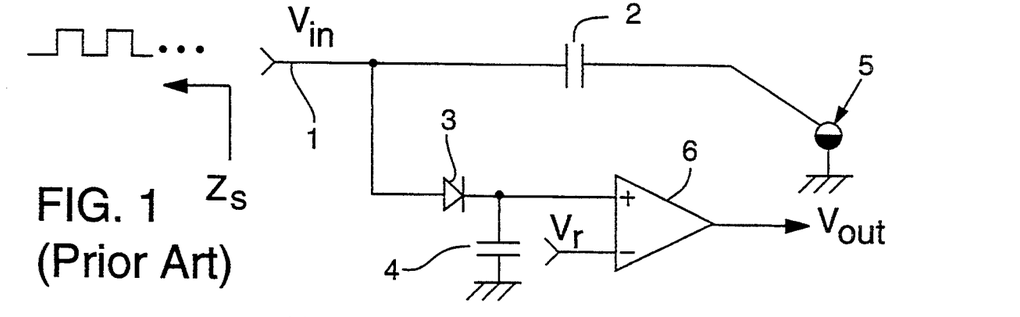
FIG. 1 is a schematic diagram of a prior art circuit for detecting an open circuit failed condition of a thermocouple by rectifying a square wave received by the thermocouple.

One known method for detecting a failed open circuit thermocouple is illustrated in FIG. 1. A square wave signal received at input 1 is applied to thermocouple 5 via coupling capacitor 2. The source of the square wave signal has a source impedance $Z_s$. The source impedance and the resistance of thermocouple 5 provide a resistor network for dividing the available magnitude of the input signal and producing a signal at input 1. When thermocouple 5 is operating normally and its resistance is accordingly low, the associated divider network produces a low magnitude for the divided signal. In contrast, when the thermocouple fails and becomes an open circuit, the magnitude of the divided signal increases. Diode 3 is disposed in series between input 1 and comparator 6, its anode being connected to input 1 and its cathode being connected to the positive input of comparator 6. Shunting capacitor 4 is also connected to the plus input of comparator 6 and provides a shunt filtering capacitor for filtering the signal as rectified by diode 3. The negative input of comparator 6 is connected to reference voltage $V_r$. When the thermocouple is operating normally with low resistance, the peak detecting circuit comprising rectifying diode 3 and capacitor 4 generates a low output voltage generally corresponding to the magnitude of the square wave available at the input 1.

The value of reference voltage $V_r$ is set to be greater than the filtered rectified voltage when the thermocouple is operating normally, but less than the filtered rectified voltage when the thermocouple has failed to an open circuit condition. Upon the occurrence of such failure, the magnitude of the divided signal increases and the filtered rectified voltage becomes greater than the reference voltage $V_r$ whereby comparator 6 reports the open circuit condition by transitioning $V_{out}$ from a low voltage to a high voltage. One of the disadvantages of this prior art circuit is its susceptibility to noise. With thermocouple 5 in a noisy environment, it electrically couples noise from the environment to the peak detection circuitry which may trip and cause comparator 6 to report an erroneous failure condition.

Figure 2:
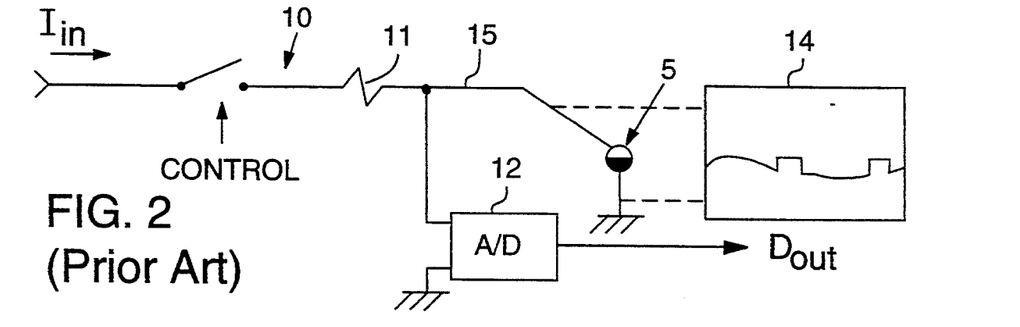
FIG. 2 is a schematic diagram of a prior art circuit for detecting an open circuit failed condition of a thermocouple by measuring the voltage produced by the thermocouple in response to a current pulse.

Another prior art circuit is shown in FIG. 2 wherein a small current pulse is applied through resistor 11 to thermocouple 5 which provides a voltage pulse in response thereto. A/D circuit 12 digitizes the voltage pulse and produces digital signal $D_{out}$. By processing the digital signal to determine a pulse amplitude change, the presence of an open circuit thermocouple may be determined. In operation, a control signal periodically closes switch 10 for applying current to the thermocouple. When the thermocouple is operating normally, its resistance is low and the resulting voltage pulse produced has a low amplitude. In contrast, when the thermocouple is in an open circuit condition, the voltage pulse has a large amplitude and the change in pulse amplitude can be detected and reported. A problem with this prior art circuit is that when an external instrument, such as a strip chart recorder 14, is attached across the thermocouple, the instrument may receive and record undesirable artifact glitches corresponding to the applied pulses.

Figure 3:
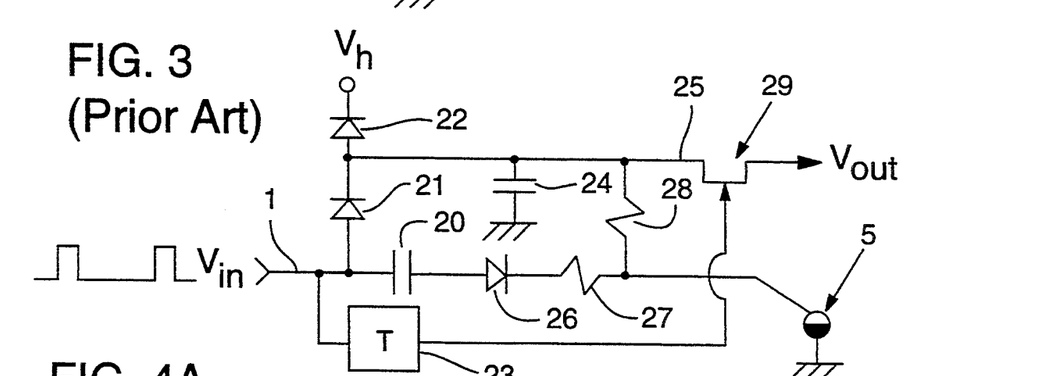
FIG. 3 is a schematic diagram of a prior art circuit for detecting an open circuit failed condition of a thermocouple by applying a pulse to a rectifying RC network which encompasses the thermocouple in a discharge path, monitoring an integrated voltage corresponding to accumulated charge within the RC network and signaling the thermocouple failure when the RC discharge path is interrupted by the open circuit failed condition and the integrated voltage rises above a given threshold.

Another prior art circuit is illustrated in FIG. 3 wherein small voltage pulses $V_{in}$ are applied to input 1 for producing an output voltage $V_{out}$, wherein the average value of $V_{out}$ depends on the thermocouple's condition. In one path, $V_{in}$ is coupled in series through capacitor 20, diode 26 and resistor 27 to thermocouple 5. In a second path, the input is applied through diode 21 to $V_h$-limiting diode 22, as well as through shunting capacitor 24 and resistor 28 to thermocouple 5. Sensing node 25, joining the cathode of diode 21, the anode of diode 22, shunting capacitor 24 and resistor 28, carries a sensing voltage in accordance with the accumulation of charge across shunting capacitor 24. In a third path, the input voltage is applied, via timing block 23, to the gate of integrating/sampling FET 29 for periodically sampling the sensor voltage.

In operation of the FIG. 3 circuit, the shunting capacitor 24 acts as an integrating capacitor and accumulates charge with each leading edge of the input pulse $V_{in}$. Following each leading edge, the capacitor discharges accumulated charge according to an RC time constant associated with capacitor 24, resistor 28 and the resistance of thermocouple 5 (ignoring the resistance of FET 29 when the FET is off and ignoring the resistance of a voltage measurement device when the FET is on). When thermocouple 5 is operating normally, the integrating capacitor discharges rapidly between leading edges through a low resistance discharge path comprising resistor 28 and the low resistance of thermocouple 5, thus providing a low sense voltage when sampled. On the other hand if thermocouple 5 fails in an open circuit condition, the discharge path resistance becomes high and the integrating capacitor accumulates charge with each leading pulse edge with no discharge therebetween until the sense voltage limits at $V_h$. Once the voltage level at node 25 exceeds a predetermined threshold, an open circuit condition is detected. A problem with this circuit is that it requires several input pulses before the integrating capacitor accumulates enough charge for raising the sense voltage to the threshold voltage, i.e., it is slow.

Figure 4A:
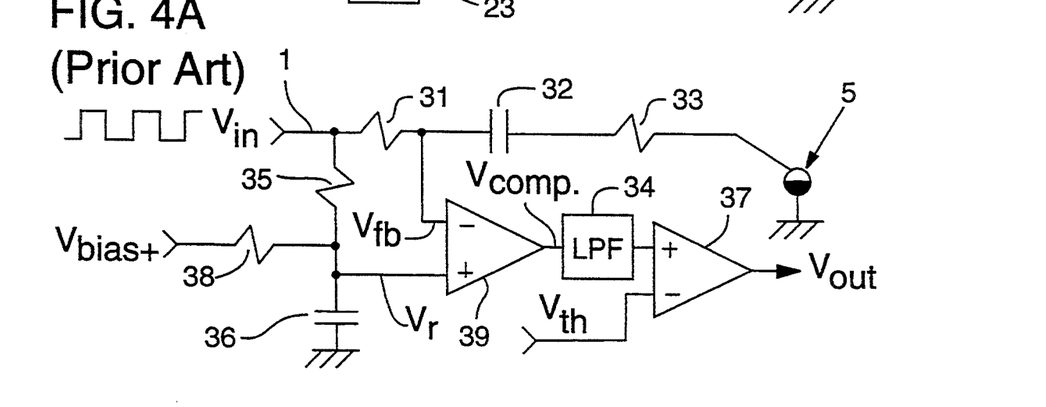
FIG. 4a is a schematic diagram of a prior art circuit for detecting the presence of an open circuit condition of a thermocouple by sensing when a voltage $V_{comp}$ becomes a square wave.

In a prior art circuit as illustrated in FIG. 4a, $V_{comp}$ is a DC voltage when thermocouple 5 is operating normally and a square wave when the thermocouple has failed to an open circuit condition. A square wave signal $V_{in}$ is received at input 1 and applied to resistors 31 and 35. The opposite side of resistor 31 is coupled to the negative input of comparator 39 and also to capacitor 32 disposed in series with resistor 33 and thermocouple 5. The terminal of resistor 35 opposite input 1 is attached to the positive input of comparator 39 as well as to shunting capacitor 36. A small bias voltage $V_{bias+}$ is supplied through resistor 38 to the positive input of comparator 39.

Figure 4B:
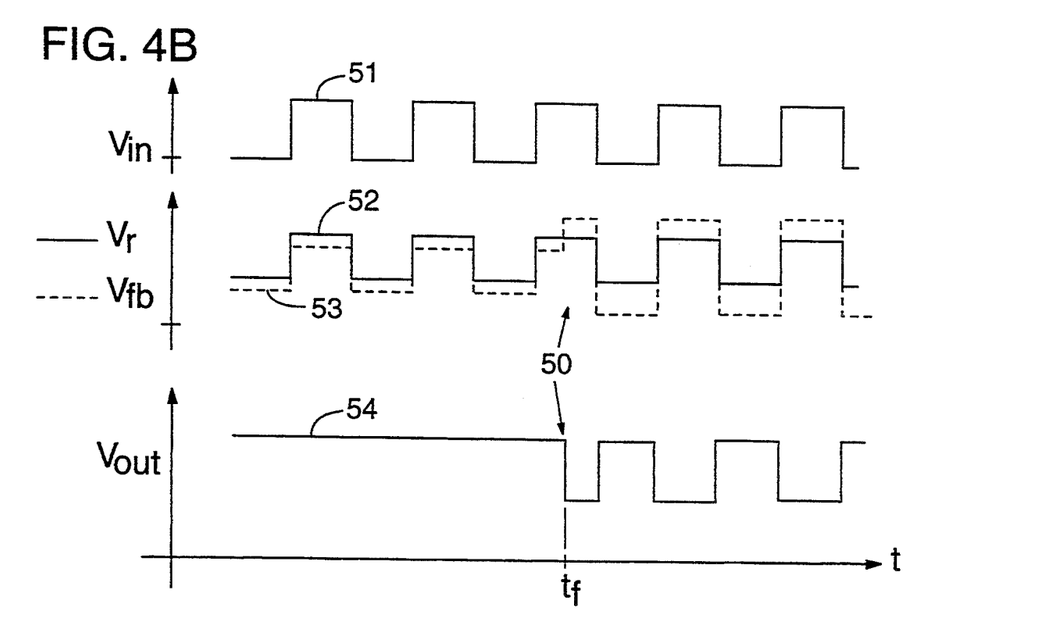

With reference to FIG. 4b, when the resistance of the thermocouple is low, i.e. operating normally, the feedback voltage $V_{fb}$ provided at the minus input of comparator 39 is always lower than the reference voltage $V_r$ provided at the plus input of the comparator. $V_{fb}$ at the negative input of comparator 39 is a square wave having an amplitude comparable to $V_r$ at the positive input but offset just below $V_r$, the latter being provided with a slight DC offset as a result of $V_{bias}$. Consequently, the comparator's output $V_{comp}$ is a DC output represented by curve 54.

When the thermocouple fails, $V_{comp}$ becomes a square wave. FIG. 4b shows that at the time of failure, $T_f$, the feedback voltage $V_{fb}$, 53, increases in magnitude for providing the negative terminal of the comparator with a voltage greater than that at the positive input for changing $V_{comp}$ to a square wave. Low pass filter 34 filters $V_{comp}$ and drives a voltage comparator 37 with its average DC voltage. Comparator 37 then determines when the filtered voltage drops below given threshold $V_{th}$ and signals an open circuit condition.

A problem with the FIG. 4a circuit occurs as a result of an amplitude/noise compromise. If the amplitude of the input voltage is low, it is possible for the thermocouple to pick up extraneous noise causing comparator 37 to signal an erroneous open circuit detection. On the other hand, if the amplitude of the input is too high (for overcoming noise problems), externally attached instruments, i.e. such as a strip chart attached to the thermocouple, may observe the applied input square wave and record respective artifact glitches.

A derivative prior art circuit of FIG. 4a uses synchronous detection, wherein the low-pass filter of FIG. 4a is replaced with a synchronous detector. Rather than low-pass filtering the square wave for DC and detecting when the average voltage shifts, a synchronous detector determines the presence of the square wave once the thermocouple fails.

SUMMARY OF THE INVENTION

It is accordingly an object of the present invention to provide an improved non-interfering apparatus and method for detecting an open circuit failed condition of a thermocouple.

It is another object of the present invention to provide a thermocouple open circuit failure detector circuit having greater immunity to noise and providing nearly instantaneous detection of open circuit conditions while avoiding application of artifact signals to externally attached instruments and the like.

The open circuit detector circuit according to the present invention for testing a thermocouple comprises a generator and a monitoring circuit coupled to a node. The node electrically interfaces the thermocouple while the generator, of given source impedance, sources the thermocouple with a tone signal of a known frequency and amplitude. The monitoring circuit monitors an amplitude of a spectral part of a resultant tone signal, encompassing the known frequency, and provides an output according to that amplitude.

In accordance with an embodiment of the present invention, a monitoring circuit comprises a conversion device, a transform device and a detector. The conversion device digitally samples the tone signal for converting the resultant tone signal into a digital format. The transform device provides a discrete Fourier transformation of the digital signal for supplying a frequency spectrum. A detector device analyzes the frequency spectrum and determines when the power within a given frequency span exceeds a predetermined threshold.

In accordance with a particular embodiment of the present invention, the generator comprises a frequency divider for receiving and dividing a clock signal down to a signal having a fundamental frequency corresponding to a known value. A processing device receives, filters and amplifies the frequency divided signal for selecting the fundamental frequency and establishing a known amplitude thereof. An output network provides a known source impedance by which the generator sources the tone signal to the node.

In accordance with another embodiment of the present invention, an aforesaid generator produces a tone signal with a frequency that changes with respect to time, and an aforesaid monitoring circuit tracks the frequency changes accordingly.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 4b is a graph illustrating waveforms for illustrating the operation of the prior art circuit of FIG. 4a;

DETAILED DESCRIPTION

Figure 5:
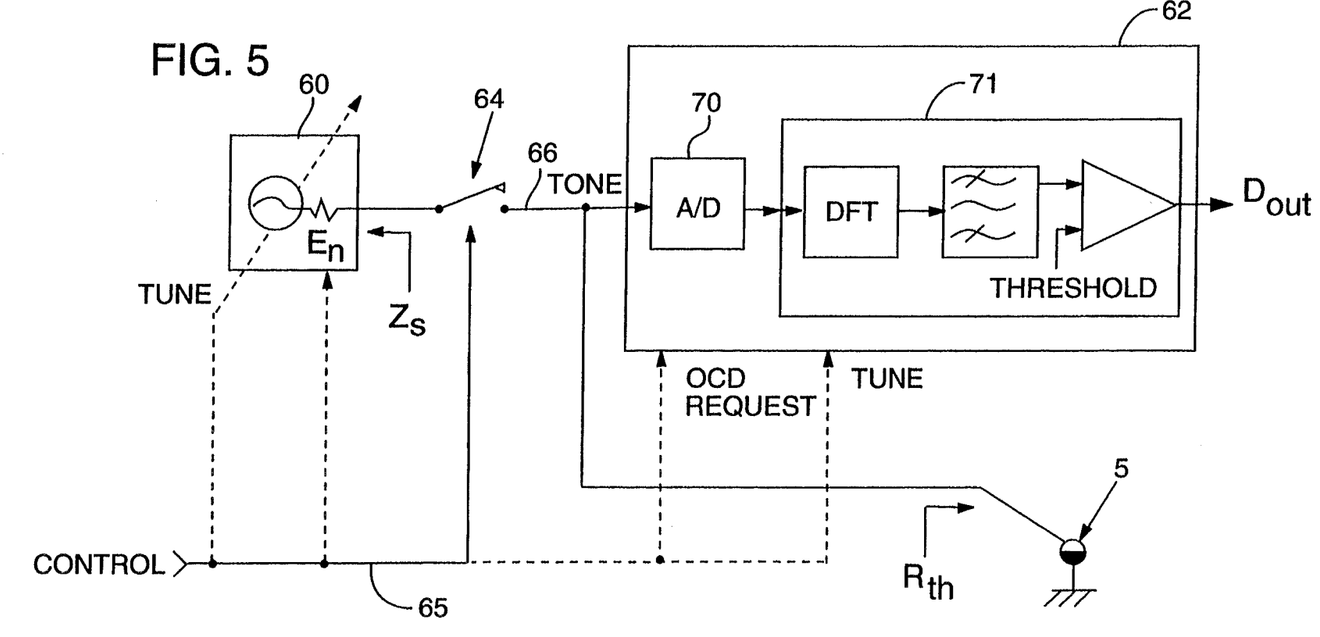
FIG. 5 is a block diagram illustrating a circuit according to the present invention.

Referring to the drawings and particularly to FIG. 5, a circuit is illustrated according to the present invention for detecting open circuit failure of a thermocouple. Generator 60 of given source impedance $Z_s$ provides switch 64 an electrical tone signal of a known frequency and amplitude. The switch receives a control signal from input 65, which periodically enables switch closure for applying the tone signal to thermocouple 5 via sense node 66. Monitoring device 62 receives the signal from sense node 66 and analyzes the amplitude of a given frequency of the signal at a given time to determine when the thermocouple has failed.

When the thermocouple is operating normally, it has a low resistance and the resultant tone signal produced at the sense node has an amplitude corresponding to the amplitude of the known tone signal divided by a voltage divider network comprising the thermocouple's resistance $R_{th}$ and the generator's source impedance $Z_s$. The monitoring device isolates and examines the amplitude of a particular frequency component of the resultant tone signal—the frequency component corresponding to the known frequency of the tone signal as produced by generator 60. If the amplitude at that frequency is less than a predetermined threshold, the monitoring device 62 provides data $D_{out}$ indicating the thermocouple is operating properly. On the other hand, when the thermocouple fails and presents an open circuit, the monitoring device output indicates that the amplitude of the frequency component has increased beyond the given threshold and the thermocouple is inoperative.

When using the thermocouple for a temperature measurement, the monitoring device opens the switch before reading the thermocouple's voltage. With the generator disconnected, a high impedance is provided at the sense node for enhancing the voltage available at the sense node for measurement. In contrast, when the switch is closed for coupling the tone signal to the thermocouple during an open circuit detection measurement, the generator lowers the impedance at sense node 66 and likewise lowers the DC voltage component produced at the sense node by the (functional) thermocouple.

In an alternative embodiment of the present invention, switch 64 is not present and the generator is always connected to the thermocouple.

In another embodiment of the present invention, control signal 65 also controls when the generator is to produce the tone signal and determines when the monitoring device is to analyze the resulting tone signal.

In a preferred embodiment of the present invention as specifically depicted in FIG. 5, the monitoring device 62 comprises A/D converter 70 and processor 71. Converter 70 receives the analog tone signal from sense node 66 and samples the same for converting it to a digital format. The converter can be a standard A/D converter or preferably a Delta Sigma modulating over-sampler followed by a decimator such as disclosed in application Ser. No. 08/097,687, filed Jul. 26, 1993 (F-238) hereby incorporated by reference. Processor 71 receives the digital signal, transforms the digital signal (e.g. via a Discrete Fourier Transform), and selects a particular spectrum of the transformed signal encompassing the frequency of the original tone. An internal register of the processor presents a predetermined amplitude threshold value to a comparator which compares that amplitude threshold value with the amplitude of the selected frequency component. When the amplitude at the particular spectrum of the transformed signal, i.e., the power level at the tone signal's frequency, exceeds the threshold, the processor reports an open circuit thermocouple. If the amplitude is less than the threshold, the processor reports normal operation.

Figure 8:
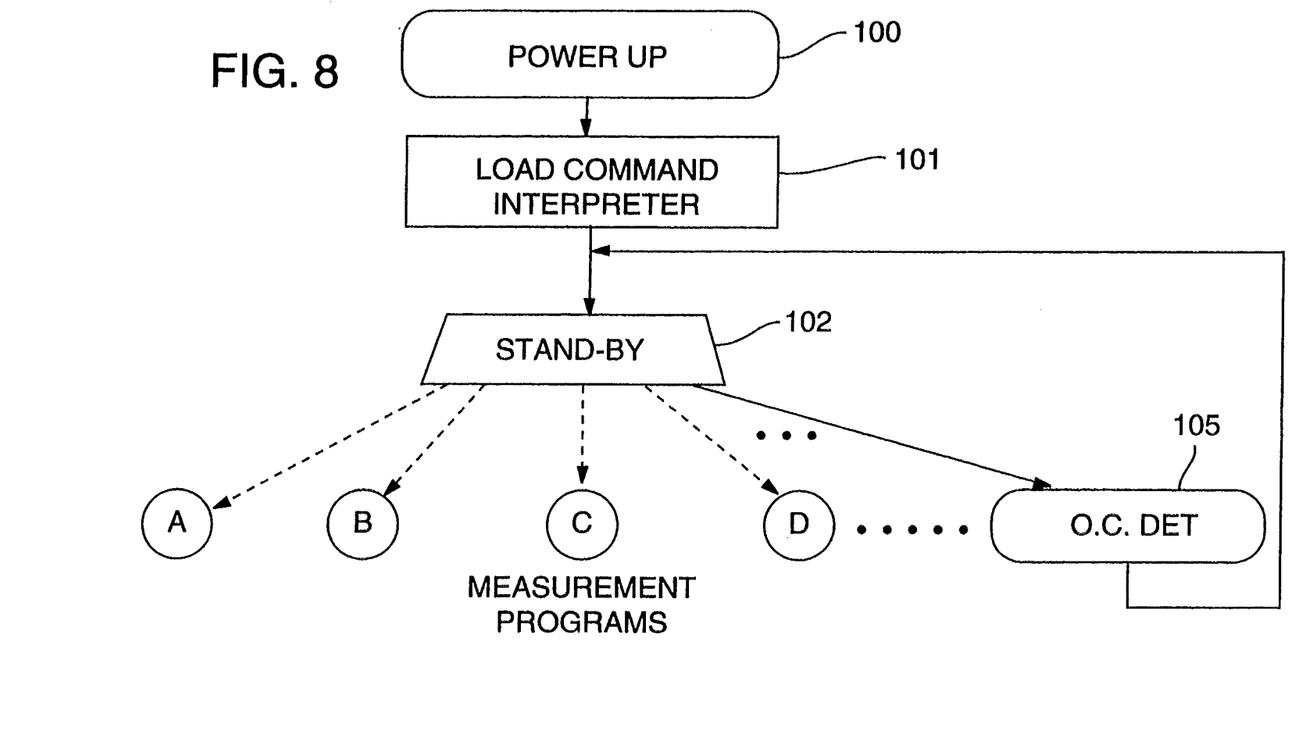
FIG. 8 is a flow chart illustrating power-up initiation and operation of the open circuit detection measurement routine by the digital signal processor of FIG. 7.

Ideally, the monitor device utilizes circuitry already existing within another measurement system of the same apparatus. The common circuitry, such as convertor 70 and processor 71, is time-shared between a task such as determining temperature (circle A of FIG. 8) and the task of testing the thermocouple for an open circuit condition (105 in FIG. 8). A requirement of the shared circuitry is that it have sufficient clocking and processing speeds for sampling, selecting and examining the fundamental frequency of the tone signal.

Figure 7:
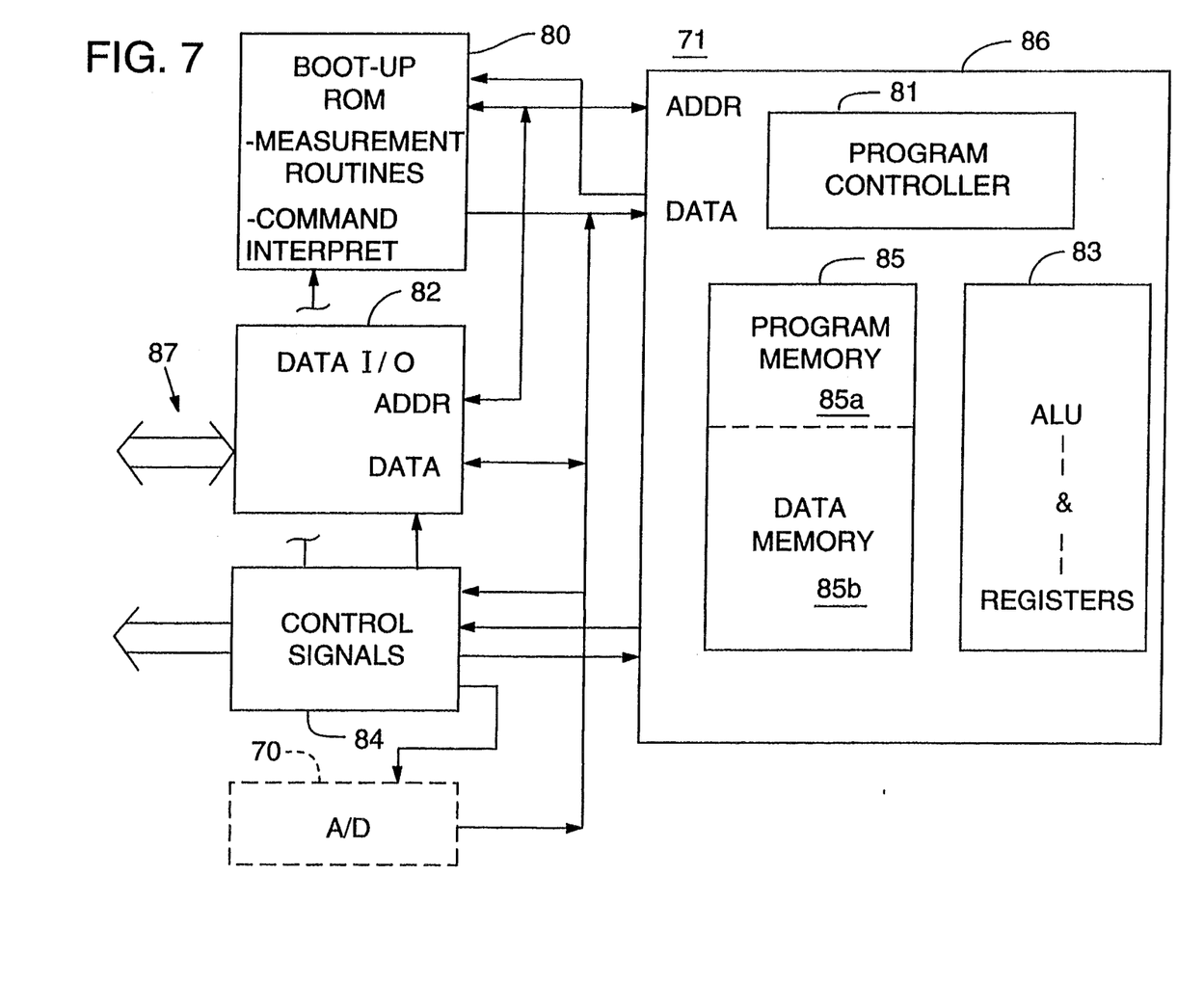
FIG. 7 is a block diagram illustrating a processor circuit for a monitoring device of FIG. 5.

With reference to FIG. 7, processor 71 suitably comprises a digital signal processor 86 (such as an ADSP-2105KP-40) and appropriate boot-up memory 80 (such as TMS27PC512), interfacing 82 (such as a dual port RAM MC68HC35FN) and control 84 (such as programmed PAL's PALC22V1035JC) circuitry. With reference to the flow charts of FIGS. 8 and 9, the processor enters power-up 100 when the measurement system is first energized and executes a power-up program located in permanent ROM of the program memory space 85a of memory map 85. During this power-up, program controller 81 is instructed to address boot-up ROM 80 and signal the control block 84 to generate the control signals needed for transferring data from the boot-up ROM to the respective program 85a and data 85b memory spaces of memory map 85, for loading command interpreter 101 into the digital signal processor 86. The program controller 81 then transfers execution to standby mode 102, a program retrieved during power-up. In the standby mode 102, the digital signal processor receives an external command via the data interface 82. Data interface 82 acquires a command from bus 87 and generates an interrupt causing the digital signal processor to retrieve the command, acknowledge the interrupt, and prompt the control block to generate signals needed for transferring command data from the interface to the digital signal processor. The processor's program controller receives and interprets the command and begins executing a respective program, i.e. A, B, C . . . . When an open circuit detection command is received, the controller enters the open circuit detection program 105.

Upon starting the open circuit detection measurement (110 in FIG. 9), the processor at 112 retrieves the open circuit detection program from the boot-up ROM, with the control block generating the control signals for transferring the open circuit detection program data from the boot-up ROM to the digital signal processor. In configuring the processor for this measurement, the program controller is instructed to retrieve a predetermined threshold amplitude value for storage in an internal register. The threshold value is obtained from either the external interfacing bus at 114 or from the boot-up ROM as noted at 115 as a default threshold amplitude value. When the threshold value is supplied via the bus, the value is either transferred in conjunction with the initiating command or subsequent thereto.

Figure 9:
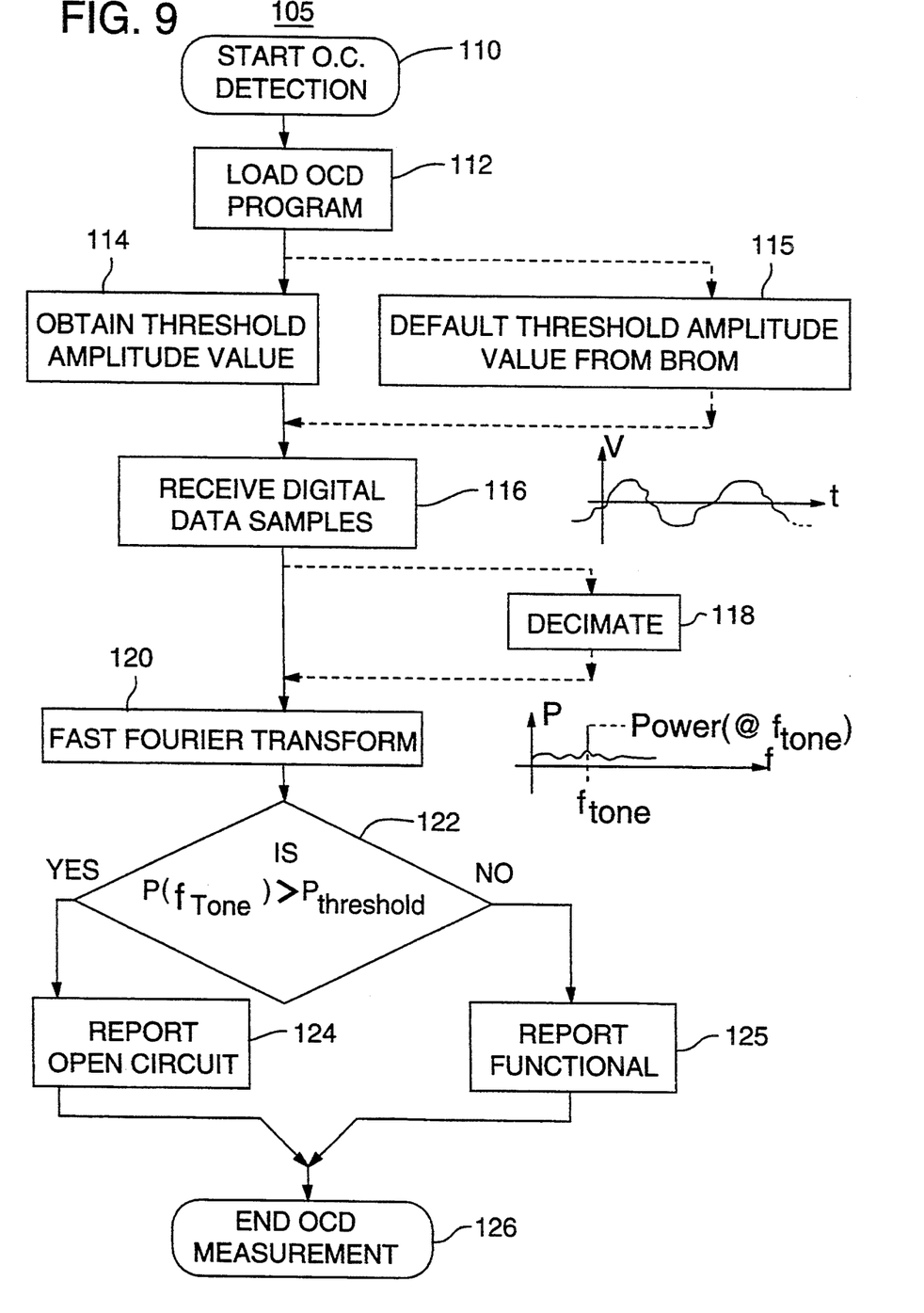
FIG. 9 is a flow chart illustrating an open circuit detection measurement procedure, block 105 of FIG. 8.

In step 116, the processor receives data samples from an external source, such as A/D convertor 70, while instructing control block 84 to provide the appropriate signals for sequentially receiving the samples and storing them in data space 85b of memory map 85. The number of samples received according to the preferred embodiment is limited to the internal data space of the digital signal processor. In an alternative embodiment, the data space is augmented using external memory.

After receiving the samples, the processor transforms the data using a Discrete Fourier Transform (DFT) for providing a frequency spectrum. The sampling rate associated with the data samples and the number of data points used in the DFT determine the resolution of the frequency spectrum provided. For example, if the number of points used in the DFT is 512 and the external source is sampled at a 1 MHz rate, then the resulting resolution per bin will be $$\text{Resolution} = \frac{\text{sampling frequency}}{\text{\# of points}}$$
$$= \frac{1 \text{ MHz}}{512 \text{ points}}$$
$$\text{Resolution} = 1,953 \text{ (Hz/bin)}$$

Nyquist's cutoff frequency represents the maximum frequency which may be reconstructed from a given sample record and corresponds to the sampling frequency divided by two. For example, if the samples were produced at a 1 MHz sampling rate, then the cutoff frequency is 500 kHz. If the converter is an oversampler, then the Nyquist cutoff frequency is greater than the upper frequency of the sampled signal and an additional decimation step 118 (FIG. 9) may be performed by the processor for lowering the effective sample rate of the received data before performing the Fourier transformation. Accordingly, decimation enhances the resolution available for the frequency spectrum.

By lowering the effective sampling rate, decimation also lowers the Nyquist cutoff frequency. If the signal before decimation includes components of higher frequency than the new Nyquist cutoff frequency, then the higher frequency components, during decimation, will foldover the cutoff and be modulated into the lower band so as to alias the resulting decimated signal. To prevent aliasing of the decimated signal, the decimation typically includes filtering for attenuating frequency components of higher than the cutoff frequency and it becomes evident that the decimation factor for which the data may be decimated is limited according to the original cutoff frequency divided by the maximum frequency of the tone signal. For example, if it is known that the tone frequency is 100 kHz, and the input sampling rate is 1 MHz, then the original cutoff frequency is 500 kHz and the original data may be decimated by a factor of 500 kHz/100 kHz=5. Using the examples above, it may also be shown that the enhanced spectral resolution is equal to (100 kHz×2)/512=391 (Hz/bin).

After obtaining the frequency spectrum, of either normal or enhanced resolution, the processor retrieves an amplitude value of a bin location of the spectrum corresponding to the original tone frequency and compares the retrieved value with that of the previously stored threshold value (within the ALU) to determine whether or not to report an open circuit condition. If the amplitude for the bin location is greater than the threshold value, then the processor reports an open circuit condition at 124 for the thermocouple measurement. Otherwise, the processor reports, at 125, a functional thermocouple.

To provide the report, the program controller is instructed to transfer the respective data to the data interfacing circuit and signal the control block to supply the signals needed for transferring the data report. Once the data report is received by interfacing circuit 82, the latter circuit provides a data report for data bus 87 and generates an external interrupt for signaling that the report is available. After providing the report, the measurement routine ends at 126 in FIG. 9 and program execution returns to the standby mode 102, awaiting a subsequent command instruction.

According to an embodiment of the invention, the DFT is performed according to a DFT method as taught by Oppenheim and Schafer, *Discrete-Time Signal Processing* (Prentice-Hall, Englewood Cliffs, N.J. 1989).

Figure 10:
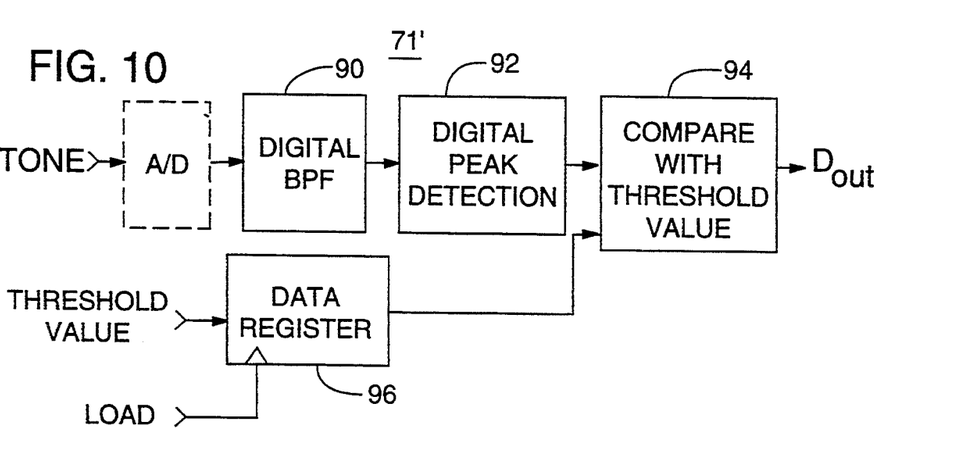
FIG. 10 is a block diagram of an alternative processor.

FIG. 10 is a block diagram for illustrating an alternative processor 71'. The processor comprises a digital bandpass filter 90, digital peak detector 92, comparator 94 and data register 96. The digital bandpass filter 90 receives digital data from an external source such as an A/D convertor and digitally processes the received digital samples for selecting a given frequency component of the received input signal. The peak detector 92 determines the amplitude deviations of the given frequency component and sends data to comparator 94 representative of peak-to-peak excursions. Data register 96 contains a predetermined threshold value as previously loaded therein. The comparator then receives and compares the threshold value with the amplitude detected for determining whether or not an open circuit condition exists. If the detected amplitude is greater than the threshold value, then the comparator reports an open circuit condition. Otherwise, the comparator reports a functional thermocouple.

Figure 11:
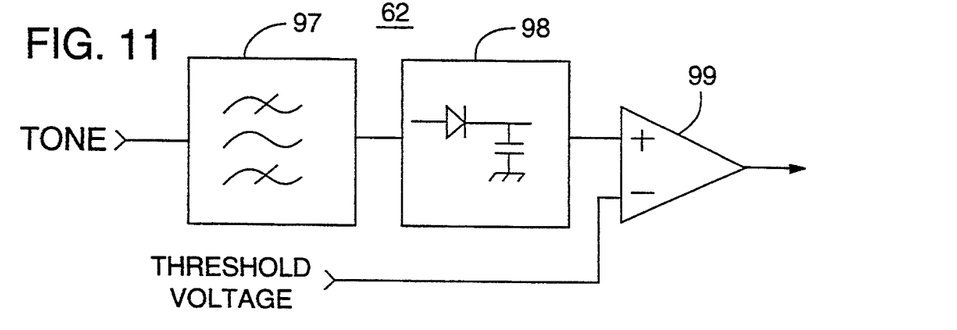
FIG. 11 is a block diagram of an analog circuit for the monitoring device 62.

FIG. 11 is a block diagram illustrating an alternative analog type circuit that may be employed for monitoring device 62, such circuit comprising a bandpass filter 97, a peak detector 98 and a comparator 99. The bandpass filter selects a predetermined frequency component of the resultant tone signal. Peak detector 98 provides a DC detected output corresponding to the peak-to-peak amplitude deviation of the selected frequency component. Comparator 99 compares the detected output with a threshold voltage to determine whether or not to report an open circuit condition.

Figure 6:
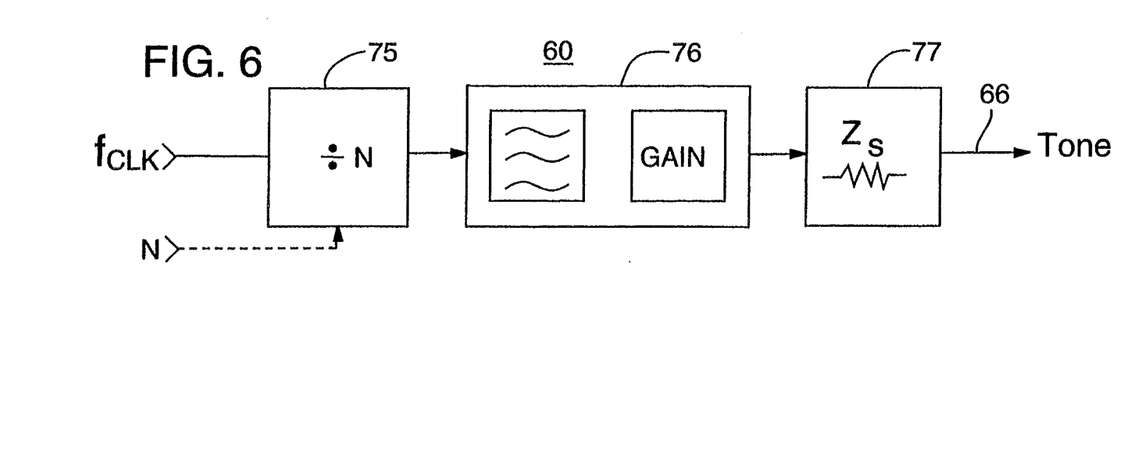
FIG. 6 is a block diagram illustrating a generator circuit for providing a tone signal with a known frequency and amplitude.

FIG. 6 is a block diagram of a circuit embodiment for generator 60, suitably comprising a divider network 75, filtering and gain means 76 and an impedance circuit 77. The divider network 75 receives and divides a clock having a frequency $f_{clk}$ for supplying a divided signal of frequency $f_{clk}/N$. The filtering and gain block 76 then receives the divided signal, filters the signal for extracting the fundamental frequency thereof and amplifies the same. Impedance circuit 77 provides a given source impedance $Z_s$ with which to forward the filtered and amplified signal as an analog tone signal to the sense node 66.

Figure 12:
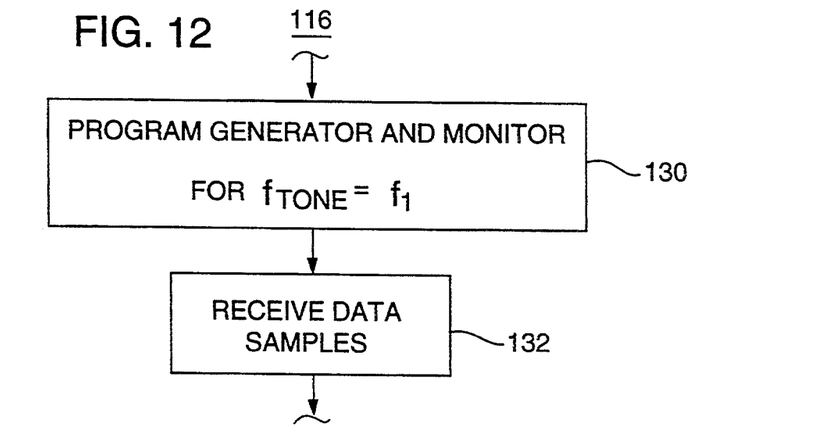
FIG. 12 is a flow chart illustrating the programming of a programmable generator.

In yet another embodiment of the present invention, the generator comprises a programmable generator. Referring to FIG. 12, step 116 of the hereinabove referenced flow chart of FIG. 9 comprises a step 130 for programming the generator and the monitoring device for generating and monitoring respectively a tone frequency F1. The generator is programmed via data interface 82. In the preferred embodiment, the monitoring device is programmed by changing the bin of the frequency spectrum to be examined.

In yet another embodiment of the present invention, the generator is programmed for supplying a tone signal with an output frequency which changes with respect to time. In such an embodiment, a control signal supplies additional information to the generator for specifying frequency changes. Similar information is supplied to the monitoring device 62 so that it tracks the frequency changes of the generator. By changing the frequency of the tone signal with respect to time, the probability of environmental noise interfering with the open circuit detection is greatly reduced. Interference noise generally occupies a fixed, finite frequency spectrum (e.g. power supply, radio station, etc.). If the detector circuit utilizes a variety of different frequencies, the time spent at any one fixed frequency is reduced along with the probability of an interfering signal causing an erroneous report. With reference to FIGS. 9 and 12, steps 130, 132, 120, 122, 124 and 125 are performed a plurality of times with a variety of different tone frequencies, $F_1$, $F_2$ . . . . A plurality of respective reports are then statistically processed for yielding a representative summation report.

In another embodiment of the present invention, generator 60 is modulated according to a control input. The monitoring device is programmed for detecting the modulation. If the modulation is discernible above a given threshold, then the generator and monitoring device will remain programmed for supplying and monitoring the current tone frequency. If the modulation is not perceived, e.g. due to noise, then the monitoring device and generator are reprogrammed for a different frequency.

The present invention is particularly attractive when the system with which it is incorporated already comprises elements of the monitoring device and/or signal generator, wherein such elements may be time-shared. The thermocouple under test is typically employed in a system such as a temperature measurement system. If a digital signal processor is already incorporated within such system for assisting/executing the task of temperature measurement, i.e. circle A of FIG. 8, then open circuit detection according to the present invention is desirably incorporated by means of time sharing the existing processor with minimal additional cost. Similarly, if the system already includes a clock, then the tone signal may be generated as described above by dividing the clock and filtering and amplifying the divided signal.

By analyzing the resultant signal over a limited frequency span, the detector of the present invention improves noise immunity and avoids prior art amplitude/noise limitations. Also, the detector according to the present invention provides nearly instantaneous open circuit detection.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An open circuit detector for testing a thermocouple, said circuit comprising:
   node means for receiving a tone signal and interfacing the thermocouple to receive the tone signal;
   generator means of a known source impedance for providing and sourcing said tone signal with a known frequency and a known amplitude to said node means; and
   means for monitoring a spectral part of a resultant tone signal provided at said node means, and supplying an output according to the amplitude of the spectral part of the resultant tone signal.

2. An open circuit detector according to claim 1 wherein the spectral part spans a frequency encompassing the known frequency.

3. An open circuit detector according to claim 1 further comprising switching means in series between said generator means and said node means, the switching means being coupled for receiving the tone signal and a control signal for selectively applying the tone signal to said node means.

4. An open circuit detector according to claim 1 wherein said generator means comprises:
   divider means receiving and dividing a clock signal for providing a divided signal having a fundamental frequency corresponding to the known frequency;
   processing means for supplying the tone signal by filtering and amplifying the divided signal so as to select the fundamental frequency component and establish a given amplitude thereof; and
   output means for providing said known source impedance by which to source the tone signal as produced by the processing means to said node means.

5. An open circuit detector according to claim 1 wherein said monitoring means comprises:
   conversion means for digitally sampling the resultant tone signal so as to convert the resultant tone signal into a digital signal;
   transform means for transforming the digital signal with a discrete Fourier transformation to provide a frequency spectrum thereof; and
   detector means for analyzing a span of the frequency spectrum and detecting when the power within the span exceeds a predetermined threshold, the span encompassing the known frequency.

6. An open circuit detector according to claim 1 wherein said generator means produces the tone signal with a frequency which changes with respect to time and said monitoring means tracks the frequency changes.

7. A method of testing a thermocouple, said method comprising the steps of:
   applying, via a known source impedance, a tone signal across the thermocouple, said tone signal having a known frequency and a known amplitude;
   obtaining a resultant signal effected across the thermocouple; and producing an output according to an amplitude of a spectral part of the resultant signal.

8. A method of testing a thermocouple according to claim 7 wherein the spectral part encompasses said known frequency.

9. A method according to claim 8 wherein the output producing step produces said output when the amplitude of the spectral part reaches a predetermined threshold.

10. A method according to claim 8 including generating the tone signal by:
dividing a clock signal for providing a divided signal having a fundamental frequency corresponding to said known frequency;
filtering and amplifying the divided signal for providing the tone signal by selecting the fundamental frequency component and establishing a given amplitude thereof; and
providing said known source impedance by which to source the tone signal.

11. A method according to claim 8 wherein the applying step selectively applies, according to a control signal, the tone signal across the thermocouple.

12. A method according to claim 8 including generating said tone signal having a frequency which changes with respect to time and wherein the spectral part is examined in frequency tracking relation to the frequency of said tone signal.

13. A method of testing a thermocouple for an open circuit condition, said method comprising the steps of:
applying a tone signal across the thermocouple, the tone signal having a known frequency and a known amplitude;
receiving a resultant signal available across the thermocouple;
digitally sampling the resultant signal for converting the resultant signal into a digital signal;
processing the digital signal with a discrete Fourier transformation for providing a frequency spectrum of the resultant signal; and
detecting when the power level within a span of the frequency spectrum exceeds a predetermined threshold.

14. A method according to claim 13 wherein the span encompasses said known frequency.

15. A method according to claim 13 further comprising the preliminary step of:
determining said known frequency for the tone signal according to frequency spans of said resultant tone signal which are free of interference noise.

16. A method according to claim 15 wherein said determining step comprises:
(a) applying a test signal of a first frequency across the thermocouple;
(b) receiving a resultant test signal available across said thermocouple;
(c) modulating said test signal;
(d) changing the frequency of said test signal if the modulation is not discernible on the resultant test signal;
(e) repeating step (d) until the modulation is discernible on the resultant test signal; and
(f) using the frequency of said test signal at which the modulation is discernible as said known frequency for the tone signal.

* * * * *